US012692376B2

(12) United States Patent
Kahlen et al.

(10) Patent No.: US 12,692,376 B2
(45) Date of Patent: Jul. 28, 2026

(54) POLYOLEFIN COMPOSITION COMPRISING POLYPROPYLENE POLYMERS AND RECYCLED PLASTIC MATERIALS

(71) Applicant: Borealis AG, Vienna (AT)

(72) Inventors: Susanne Margarete Kahlen, Linz (AT); Hermann Braun, Linz (AT); Andreas Rössler-Czermak, Linz (AT); Giovanni Federico Benedetti, Beringen (BE); Philip Knapen, Beringen (BE)

(73) Assignee: Borealis AG, Vienna (AT)

( * ) Notice: Subject to any disclaimer, the term of this patent is extended or adjusted under 35 U.S.C. 154(b) by 588 days.

(21) Appl. No.: 18/266,981

(22) PCT Filed: Jan. 27, 2022

(86) PCT No.: PCT/EP2022/051846

§ 371 (c)(1),
(2) Date: Jun. 13, 2023

(87) PCT Pub. No.: WO2022/162042

PCT Pub. Date: Aug. 4, 2022

(65) Prior Publication Data

US 2024/0059883 A1 Feb. 22, 2024

(30) Foreign Application Priority Data

Jan. 27, 2021 (EP) ..................................... 21153783

(51) Int. Cl.
C08L 23/12 (2006.01)

(52) U.S. Cl.
CPC ......... C08L 23/12 (2013.01); C08L 2205/025 (2013.01); C08L 2205/035 (2013.01); C08L 2207/02 (2013.01); C08L 2207/20 (2013.01); Y02W 30/62 (2015.05)

(58) Field of Classification Search
CPC .......... C08L 23/12; C08L 23/10; C08L 23/04; C08L 23/14
See application file for complete search history.

(56) References Cited

U.S. PATENT DOCUMENTS 5,266,392 A 11/1993 Land et al.
5,811,494 A 9/1998 Whetten et al.

2005/0127558 A1 6/2005 Subramaniam et al.
2012/0225993 A1* 9/2012 Bernreitner .......... C08L 23/142
524/517
2014/0213719 A1 7/2014 Gahleitner et al.
2015/0368449 A1 12/2015 Kastner et al.
2019/0127565 A1 5/2019 Wang et al.
2020/0385555 A1* 12/2020 Kahlen .................. C08L 23/10
2023/0287202 A1* 9/2023 Kahlen .................. C08L 23/12

FOREIGN PATENT DOCUMENTS

| | | |
|---|---|---|
| CN | 102575073 A | 7/2012 |
| CN | 103649207 A | 3/2014 |
| CN | 104204070 A | 12/2014 |
| CN | 106232707 A | 12/2016 |
| CN | 110546198 A | 12/2019 |
| EP | 0575465 B1 | 4/1997 |
| EP | 0847420 B1 | 2/2000 |
| EP | 2338657 A1 | 6/2011 |
| EP | 3165473 A1 | 5/2017 |
| JP | 2003268175 A | 9/2003 |
| WO | 2013079457 A1 | 6/2013 |
| WO | 2015169690 A1 | 11/2015 |
| WO | WO-2018206353 A1 * | 11/2018 .............. C08L 23/10 |
| WO | 2019086359 A1 | 5/2019 |
| WO | 2020070176 A1 | 4/2020 |
| WO | 2020113461 A1 | 6/2020 |

OTHER PUBLICATIONS

Wang, "Modification and Application of Recycled Material from Waste PP Woven Bag", Plastics Science and Technology, 2010, vol. 38, English Abstract.

* cited by examiner

*Primary Examiner* — Christina H.W. Rosebach
(74) *Attorney, Agent, or Firm* — The Webb Law Firm

(57) ABSTRACT

Provided is a polyolefin composition including a) at least one heterophasic polypropylene copolymer with a melt flow rate MFR$_2$ (230° C., 2.16 kg, measured according to ISO 1133) of at least 40 g/10 min, preferably of at least 60 g/10 min; b) at least one polypropylene homopolymer with a melt flow rate MFR$_2$ (230° C., 2.16 kg, measured according to ISO 1133) of at least 400 g/10 min; and c) a blend (A) of recycled plastic material comprising polypropylene and polyethylene in a ratio between 3:7 and 12:1, which is recovered from a waste plastic material derived from post-consumer and/or post-industrial waste with a melt flow rate MFR$_2$ (230° C., 2.16 kg, measured according to ISO 1133) of at least 5 g/10 min. The polyolefin composition has a melt flow rate MFR$_2$ (230° C., 2.16 kg, measured according to ISO 1133) of at least 20 g/10 min.

15 Claims, No Drawings

POLYOLEFIN COMPOSITION COMPRISING POLYPROPYLENE POLYMERS AND RECYCLED PLASTIC MATERIALS

CROSS-REFERENCE TO RELATED APPLICATIONS

This application is the United States national phase of International Patent Application No. PCT/EP2022/051846 filed Jan. 27, 2022, and claims priority to European Patent Application No. 21153783.2 filed Jan. 27, 2021, the disclosures of which are hereby incorporated by reference in their entireties.

BACKGROUND OF THE INVENTION

Field of the Invention

The proposed solution relates to a polyolefin composition comprising at least one heterophasic polypropylene copolymer, at least one polypropylene homopolymer and recycled plastic material, to an article comprising the polyolefin composition and a process for preparing such polyolefin composition.

Description of Related Art

Polyolefins, in particular polyethylene and polypropylene are increasingly consumed in large amounts in a wide range of applications, including packaging for food and other goods, fibres, automotive components, and a great variety of manufactured articles. Taking into account the huge amount of waste collected compared to the amount of waste recycled back into the stream, there is still a great potential for intelligent reuse of plastic waste streams and for mechanical recycling of plastic wastes.

One major trend in the field of polyolefins is the use of recycled materials, which are derived from a wide variety of sources. Durable goods streams such as those derived from yellow bags, yellow bins, community collections, waste electrical equipment (WEE) or end-of-life vehicles (ELV) contain a wide variety of plastics. These materials can be processed to recover acrylonitrile-butadiene-styrene (ABS), high impact polystyrene (HIPS), polypropylene (PP) and polyethylene (PE) plastics. Separation can be carried out using density separation in water and then further separation based on fluorescence, near infrared absorption or raman fluorescence. However, it is commonly quite difficult to obtain either pure recycled polypropylene or pure recycled polyethylene.

Generally, recycled quantities of polypropylene on the market are mixtures of both polypropylene (PP) and polyethylene (PE), this is especially true for post-consumer waste streams. Moreover, commercial recyclates from post-consumer waste sources are conventionally cross-contaminated with non-polyolefin materials such as polyethylene terephthalate, polyamide, polystyrene or non-polymeric substances like wood, paper, glass or aluminum. These cross-contaminations drastically limit final applications of recycling streams such that no profitable final uses remain. Polyolefinic recycling materials, especially from post-consumer waste streams, are a mixture of PE and PP. The better the quality of the recyclate is, the less available it is and the more expensive it is.

The quality issue in recyclates compared to the virgin ones can be to some extent overcome by mixing the recyclates with virgin polymers.

Compositions comprising virgin polymers (i.e. polymers used for the first time) and recycled mixed plastics have been studied.

EP 0575465 B1 covers a polymer blend composition comprising (a) 30-70 wt % of low melting polymer comprising an ethylene/α-olefin copolymer having a density of from 0.88-0.915 g/cm³, an MFR of 1.5-7.5 dg/min, a molecular weight distribution no greater than 3.5, a composition distribution breadth index greater than 70 percent and an essentially single melting point in the range of 60° C. to 115° C. measured as a DSC peak Tm; and (b) 70-30 wt % of a propylene based polymer having from 88 to 100 mole percent propylene and from 12 to 0 mole percent of an alpha-olefin other than propylene.

U.S. Pat. No. 5,266,392 A claims a polyethylene/polypropylene blend, comprising 50 wt % of crystalline polypropylene; at least about 10 wt % of linear low density polyethylene having a density of about 0.915 to about 0.94 dispersed in a matrix of said polypropylene; and an amount of an ethylene/alpha-olefin plastomer compatibilizer having an alpha-olefin content of from ~5-~25 mol %, a melt index of above about 50 dg/min, a weight average molecular weight between about 5000 and about 50,000, a density of from about 0.88 about 0.90 g/cm³ and an X-ray crystallinity of at least 10%. This covers the use of plastomers as compatibilizers in a very general way, including of course recycling. Only rather low and rather high densities are excluded for the plastomer, but pure HDPE is also excluded.

WO 2015/169690 A1 refers to polypropylene-polyethylene blends comprising (A) 75-90 wt % of a blend of (A-1) 30-70 wt % of polypropylene and (A-2) 70-30 wt % of polyethylene and (B) 10-25 wt % of a compatibilizer being a heterophasic polyolefin composition comprising (B-I) 55-90 wt % of a polypropylene with an MFR2 between 1.0 and 300 g/10 min (according to ISO 1133 at 230° C. at a load of 2.16 kg) and (B-2) 45-10 wt % of a copolymer of ethylene and propylene or C4 to C10 alpha olefin with a glass transition temperature Tg (measured with DMTA) of below −25° C. and an intrinsic viscosity (measured in decalin at 135° C.) of at least 3.0 dl/g, whereby the blend has (i) a Charpy Notched Impact Strength (according to ISO 179-IeA, measured at 23° C.) of at least 2% higher than for the same blend without the compatibilizer (B) and at the same time (ii) a Flexural Modulus (according to ISO 178) of at least 3% higher than for the same blend without the compatibilizer (B) and additionally (iii) a heat deflection resistance (determined with DMTA) expressed by the temperature at which the storage modulus G' of 40 MPa is reached (T(G'=40 MPa)) which is at least 4° C. higher than for the same blend without the compatibilizer (B).

EP 3 165 473 A1 relates to polyolefin compositions comprising a blend (A) of recycled polypropylene and recycled polyethylene, a polypropylene having an MFR of not lower than 50 g/10 min, and a compatibilizer being a heterophasic polyolefin composition, wherein the whole composition has a MFR of higher than 25 g/10 min.

WO 2020/070176 A1 relates to polyolefin compositions which comprise recycled polyolefins and which are suitable for higher value products. The composition comprises a propylene homopolymer with an MFR of at least 400 g/10 min However, the known polymer compositions comprising recycled materials are not suited for a high-end market, rather the presently available recycle compositions target low end applications such as crates, flower pots and benches etc. The presently available recyclate compositions cannot compete with virgin materials due to their mechanical properties.

In order to serve a high-end market e.g. for high flow applications and to compete with virgin materials (in particular in the area of non-food and non-health care products), certain adjustments need to be made. Currently available recyclates are facing main problems in composition (such as fluctuation in PP and PE content), in consistency (in terms of flow properties), in their property profile (poor stiffness-impact balance), and in cross-contamination (such as non-polyolefinic components, inorganic materials such as aluminum or paper) but also in colour and odour. In particular, suitable melt flow rates are desirable for high flow applications.

Besides, polymer compositions comprising recycled materials known from the prior art comprise as virgin polymers mainly heterophasic impact copolymers (or heterophasic polypropylene copolymers) or random copolymers. These polymers comprise an EPR-phase. Furthermore, the long-term stabilization of the materials known from the prior art may not be so good that the materials could be subjected to further re-processing or recycling processes.

SUMMARY OF THE INVENTION

Thus, an object underlying the proposed solution is to provide a polyolefin composition comprising polyolefin material recovered from waste plastic material without the disadvantages of the polymer compositions according to the prior art. In particular, a compound solution of a virgin material in combination with a recyclate is of an urgent need to balance out the above mentioned issues and to serve advanced material products for the market.

This object has been solved by providing a polyolefin composition comprising:

a) 20-48 wt % of at least one heterophasic polypropylene copolymer with a melt flow rate $MFR_2$ (230° C., 2.16 kg, measured according to ISO 1133) of at least 40 g/10 min, preferably of at least 60 g/10 min;

b) 2-30 wt % of at least one polypropylene homopolymer with a melt flow rate $MFR_2$ (230° C., 2.16 kg, measured according to ISO 1133) of at least 400 g/10 min; and c) 40-60 wt %, of a blend (A) of recycled plastic material comprising polypropylene and polyethylene in a ratio between 3:7 and 12:1, which is recovered from a waste plastic material derived from post-consumer and/or post-industrial waste with a melt flow rate $MFR_2$ (230° C., 2.16 kg, measured according to ISO 1133) of at least 5 g/10 min, wherein the polyolefin composition has a melt flow rate $MFR_2$ (230° C., 2.16 kg, measured according to ISO 1133) of at least 20 g/10 min, preferably of at least 25 g/10 min.

As discussed in detail further below the melt flow rate of the present polyolefin composition can cover a wide spectrum and can be adjusted according to customer needs. The melt flow rate is an important indicator for the flow in the mold. Changes of melt flow rate have implications for conversion interface and for end-use performance. By providing polyolefin compositions with different melt flow rates customer needs can be met.

The present polyolefin composition combines virgin high flow heterophasic PP material as impact booster with a homopolymer PP material as melt flow rate enhancer for the recycled PP/PE material. This allows for the use of the polyolefin composition with a high amount of recycled material for current applications in the field of caps and closures and packaging like lids, in particular thin wall packaging applications.

For the purposes of the present description and of the subsequent claims, the term "recycled" is used to indicate that the material is recovered from post-consumer waste and/or post-industrial waste. Namely, post-consumer waste refers to objects having completed at least a first use cycle (or life cycle), i.e. having already served their first purpose and been through the hands of a consumer; while post-industrial waste refers to the manufacturing scrap which does normally not reach a consumer. In the gist of the proposed solution "recycled polymers" may also comprise up to 17 wt.-%, preferably up to 3 wt.-%, more preferably up to 1 wt.-% and even more preferably up to 0.1 wt.-% based on the overall weight of the recycled polymer of other components originating from the first use. Type and amount of these components influence the physical properties of the recycled polymer. The physical properties given below refer to the main component of the recycled polymer.

As described also further below, typical other components originating from the first use are thermoplastic polymers, like polystyrene and PA 6, talc, chalk, ink, wood, paper, limonene and fatty acids. The content of polystyrene (PS) and polyamide 6 (PA 6) in recycled polymers can be determined by Fourier Transform Infrared Spectroscopy (FTIR) and the content of talc, chalk, wood and paper may be measured by Thermogravimetric Analysis (TGA).

The term "virgin" denotes the newly produced materials and/or objects prior to first use and not being recycled. In case that the origin of the polymer is not explicitly mentioned the polymer is a "virgin" polymer.

The total amount of all virgin polypropylene polymers (homopolymers and heterophasic polymers) used in the present polyolefin composition may add up to a range between 22-73 wt %, preferably between 30-65 wt %, more preferably between 38-55 wt % (based on the overall weight of the polymer composition).

The amount of the blend (A) of recycled plastic material comprising polypropylene and polyethylene in a ratio between 3:7 and 12:1, which is recovered from a waste plastic material derived from post-consumer and/or post-industrial waste, used in the present polyolefin composition may be in a range between 40-60 wt %, preferably between 45-55 wt %, more preferably between 50-55 wt % (based on the overall weight of the polymer composition).

It is to be understood that further additives may also be included in the polyolefin composition and the sum of all ingredients adds always up to 100 wt % in each of the embodiments described herein.

According to an embodiment the present polyolefin composition comprises a) 25-45 wt %, more preferably 28-35 wt % of the at least one heterophasic polypropylene copolymer;

b) 5-27 wt %, more preferably 10-25 wt % of the at least one polypropylene homopolymer; and c) 45-55 wt %, more preferably 50-55 wt % of the blend (A) of recycled plastic material comprising polypropylene and polyethylene.

and further additives, wherein the sum of all ingredients always adds up to 100 wt %.

In one further embodiment the present polyolefin composition comprises a) 20-40 wt %, preferably 25-35 wt %, more preferably 28-32 wt % of the at least one heterophasic polypropylene copolymer;

b) 10-30 wt %, preferably 12-27 wt %, more preferably 15-25 wt % of the at least one polypropylene homopolymer; and c) 40-60 wt %, preferably 50-55 wt % of the blend (A) of recycled plastic material comprising polypropylene and polyethylene and further additives, wherein the sum of all ingredients always adds up to 100 wt %.

A polyolefin composition as just described may have a melt flow rate MFR$_2$ (230° C., 2.16 kg, measured according to ISO 1133) of at least 50 g/10 min, preferably of at least 60 g/10 min, in particular in a range between 50 and 80 g/10 min, preferably between 55 and 75 g/10 min, more preferably between 60 and 72 g/10 min. Thus, depending on the ratio of the different polymer components the melt flow rate of the final polyolefin composition may be adjusted.

In a further embodiment the present polyolefin composition comprises a) 35-48 wt %, preferably 40-48 wt %, more preferably 45-48 wt % of the at least one heterophasic polypropylene copolymer;

b) 2-10 wt %, preferably 2-5 wt %, more preferably 2-3 wt % of the at least one polypropylene homopolymer; and c) 40-60 wt %, preferably 50-55 wt % of the blend (A) of recycled plastic material comprising polypropylene and polyethylene and further additives, wherein the sum of all ingredients always adds up to 100 wt %.

The melt flow rate MFR$_2$ (230° C., 2.16 kg, measured according to ISO 1133) of such a polyolefin composition is at least 20 g/10 min, preferably at least 25 g/10 min, more preferably at least 30 g/10 min, in particular in a range between 20 and 50 g/10 min, preferably between 25 and 45 g/10 min, more preferably between 27 and 42 g/10 min.

In a further embodiment, the present polyolefin composition has a tensile modulus (ISO 527-2) of at least 1200 MPa preferably at least 1300 MPa, more preferably at least 1400 MPa, in particular in a range between 1200 and 1500 MPa, more in particular between 1300 and 1400 MPa.

In yet another embodiment the present polyolefin composition has an impact strength (ISO179, charpy 1 eA+23° C.) of at least 4 kJ/m$^2$, preferably at least 5 kJ/m$^2$, more preferably at least 6 kJ/m$^2$ and even more preferably of at least 7 kJ/m$^2$, in particular in a range between 4 and 8 kJ/m$^2$, more in particular between 4.2 and 7.7 kJ/m$^2$, even more in particular between 4.8 and 7 kJ/m$^2$, and most in particular between 5.4 and 6.6 kJ/m$^2$.

In still another embodiment the present polyolefin composition has a puncture energy (ISO 6603-2, 4.4 m/s, 2 mm, 23° C.) of at least 1.5 J, preferably at least 2 J, more preferably at least 3 J, even more preferably at least 4 J, in particular in a range between 1.5 and 15 J, more particular between 2 and 12 J, even more in particular between 5 and 10 J.

Heterophasic Polypropylene Virgin Polymer

Heterophasic polypropylene copolymers comprise as polymer components a polypropylene matrix (M) and an elastomeric copolymer (E). The polypropylene matrix (M) is preferably a random propylene copolymer or a propylene homopolymer, the latter being especially preferred. The elastomeric copolymer (E) comprises units derived from propylene and ethylene and/or C4 to C20 alpha-olefins, more preferably from ethylene and/or C4 to C10 alpha-olefins and most preferably from ethylene, C4, C6 and/or C8 alpha-olefins, e.g. ethylene and, optionally, units derived from a conjugated diene.

In one embodiment, the at least one heterophasic polypropylene polymer a) used in the present polyolefin composition is selected from a group comprising at least one heterophasic polypropylene copolymer (PPHeco-1) having a melt flow rate MFR$_2$ (230° C., 2.16 kg, measured according to ISO 1133) in the range of 80 to 120 g/10 min, preferably of 90 to 110 g/10 min, more preferably of 100 g/10 min to 105 g/10 min; and at least one heterophasic polypropylene copolymer (PPHeco-2) having a melt flow rate MFR$_2$ (230° C., 2.16 kg, measured according to ISO 1133) in the range of 60 to 90 g/10 min, more preferably of 70 to 80 g/10 min.

It is to be understood that the present polyolefin composition may comprise not only one, but two heterophasic virgin polypropylene copolymers with different melt flow rates. This allows for an adjustment of the melt flow rate of the final polyolefin composition.

Heterophasic Polypropylene Copolymer (PPHeco-1)

The at least one heterophasic polypropylene copolymer (PPHeco-1) has a melt flow rate MFR$_2$ (230° C., 2.16 kg, measured according to ISO 1133) in the range of 80 to 120 g/10 min, preferably of 90 to 110 g/10 min, more preferably of 100 to 105 g/10 min.

The heterophasic propylene copolymer (PPHeco-1) of the solution has a content of soluble fraction (SF), determined according to CRYSTEX analysis, within the range from 10.0 to 25.0 wt.-%, preferably 15.0 to 20.0 wt.-%, based on the total weight of the heterophasic propylene copolymer.

The soluble fraction (SF) of the heterophasic propylene copolymer (PPHeco-1) has an ethylene content (C2(SF)), as determined by quantitative FT-IR spectroscopy calibrated by $^{13}$C-NMR spectroscopy, in the range from 15.0 to 35.0 wt.-%, preferably in the range from 20.0 to 32.0 wt.-%, more preferably in the range from 25.0 to 30.0 wt.-%.

The soluble fraction (SF) of the heterophasic propylene copolymer (PPHeco-1) has an intrinsic viscosity (iV(SF)) of not more than 4.5 dl/g, preferably not more than 3.5 dl/g, like in the range of 2.0 to 4.5 dl/g, preferably in the range of 2.7 to 3.5 dl/g, such as 3.0 dl/g.

The heterophasic propylene copolymer (PPHeco-1) preferably has a total ethylene (C2) content, as determined by quantitative FT-IR spectroscopy calibrated by $^{13}$C-NMR spectroscopy, of from 1.0 to 15.0 wt.-%, more preferably from 5 to 10.0 wt.-%, most preferably from 7.0 to 9.0 wt.-%.

The heterophasic polypropylene copolymer (PPHeco-1) may have a Charpy Notched Impact Strength (NIS) measured according to ISO 179-1 eA at 23° C. of at least 4 kJ/m$^2$, preferably at least 5 kJ/m$^2$, like in the range of 4 to 7 kJ/m$^2$, preferably in the range of 4 to 6 kJ/m$^2$, like 4 kJ/m$^2$ or 5 kJ/m$^2$. The heterophasic polypropylene copolymer (PPHeco-1) may have a tensile modulus measured according to ISO 178 of at least 1000 MPa, preferably at least 1400 MPa, like in the range of 1000 to 2000 MPa, preferably in the range of 1300 to 1800 MPa, like 1400 MPa or 1500 MPa.

Heterophasic Polypropylene Copolymer (PPHeco-2)

The at least one heterophasic polypropylene copolymer (PPHeco-2) has a melt flow rate MFR$_2$ (230° C., 2.16 kg, measured according to ISO 1133) in the range of 60 to 90 g/10 min, more preferably of 70 to 80 g/10 min.

The heterophasic propylene copolymer (PPHeco-2) of the solution has a content of soluble fraction (SF), determined according to CRYSTEX analysis, within the range from 10.0 to 20.0 wt.-%, preferably 15.0 to 18.0 wt.-%, based on total weight of the heterophasic propylene copolymer.

The soluble fraction (SF) of the heterophasic propylene copolymer (PPHeco-2) has an ethylene content (C2(SF)), as determined by quantitative FT-IR spectroscopy calibrated by $^{13}$C-NMR spectroscopy, in the range from 15.0 to 35.0 wt.-%, preferably in the range from 20.0 to 32.0 wt.-%, more preferably in the range from 25.0 to 30.0 wt.-%.

The soluble fraction (SF) of the heterophasic propylene copolymer (PPHeco-2) has an intrinsic viscosity (iV(SF)) of not more than 4.5 dl/g, preferably not more than 3.5 dl/g, like in the range of 2.0 to 4.5 dl/g, preferably in the range of 2.5 to 3.5 dl/g, more preferably in the range from 2.5 to 3.0 dl/g, such as 2.6 to 2.7 dl/g.

The heterophasic propylene copolymer (PPHeco-2) preferably has a total ethylene (C2) content, as determined by quantitative FT-IR spectroscopy calibrated by $^{13}$C-NMR spectroscopy, of from 1.0 to 15.0 wt.-%, more preferably from 5 to 10.0 wt.-%, most preferably from 6.0 to 8.0 wt.-%.

The heterophasic polypropylene copolymer (PPHeco-2) may have a Charpy Notched Impact Strength (NIS) measured according to ISO 179-1 eA at 23° C. of at least 4 kJ/m$^2$, preferably at least 5 kJ/m$^2$, like in the range of 4 to 7 kJ/m$^2$, preferably in the range of 5 to 6 kJ/m$^2$, like 5 kJ/m$^2$. The heterophasic polypropylene copolymer (PPHeco-2) may have a tensile modulus measured according to ISO 178 of at least 1000 MPa, preferably at least 1400 MPa, like in the range of 1000 to 2000 MPa, preferably in the range of 1300 to 1800 MPa, like 1500 MPa.

Polypropylene Virgin Homopolymers

The polypropylene homopolymers b) used as virgin polymers in the present polyolefin composition are selected from a group comprising at least one polypropylene homopolymer (PPH-1) having a melt flow rate MFR$_2$ (230° C., 2.16 kg, measured according to ISO 1133) in the range of 600 to 1000 g/10 min, preferably of 700 to 900 g/10 min, more preferably of 800 to 850 g/10 min;

at least one polypropylene homopolymer (PPH-2) having a melt flow rate MFR$_2$ (230° C., 2.16 kg, measured according to ISO 1133) in the range of 1000 to 1500 g/10 min, preferably of 1100 to 1300 g/10 min, more preferably of 1200 to 1250 g/10 min;

at least one polypropylene homopolymer (PPH-3) having a melt flow rate MFR$_2$ (230° C., 2.16 kg, measured according to ISO 1133) in the range of 1700 to 2300 g/10 min, preferably of 1800 to 2200 g/10 min, more preferably of 2000 to 2100 g/10 min;

at least one polypropylene homopolymer (PPH-4) having a melt flow rate MFR$_2$ (230° C., 2.16 kg, measured according to ISO 1133) in the range of 400 to 500 g/10 min, preferably of 420 to 480 g/10 min, such as 450 g/10 min.

It is to be understood that the present polyolefin composition may comprise not only one, but two or more polypropylene virgin homopolymers with different melt flow rates. This allows for an adjustment of the melt flow rate of the final polyolefin composition.

The properties and features of the different polypropylene homopolymers that may be used in the present polyolefin composition are described in the following.

Polypropylene Homopolymer (PPH-1)

The at least one polypropylene homopolymer (PPH-1) has a melt flow rate MFR$_2$ (230° C., 2.16 kg, measured according to ISO 1133) in the range of 600 to 1000 g/10 min, preferably of 700 to 900 g/10 min, preferably of 800 to 850 g/10 min.

The polypropylene homopolymer (PPH-1) has a melting temperature of at least 140° C.; preferably of at least 150° C., preferably in the range of 150 to 160° C., like 158° C.

Polypropylene Homopolymer (PPH-2)

The at least one polypropylene homopolymer (PPH-2) has a melt flow rate MFR$_2$ (230° C., 2.16 kg, measured according to ISO 1133) in the range of 1000 to 1500 g/10 min, preferably of 1100 to 1300 g/10 min, more preferably of 1200 to 1250 g/10 min;

The polypropylene homopolymer (PPH-2) has a melting temperature of at least 140° C.; preferably of at least 150° C., preferably in the range of 150 to 160° C., like 158° C.

Polypropylene Homopolymer (PPH-3)

The at least one polypropylene homopolymer (PPH-3) has a melt flow rate MFR$_2$ (230° C., 2.16 kg, measured according to ISO 1133) in the range of 1700 to 2300 g/10 min, preferably of 1800 to 2200 g/10 min, more preferably of 2000 to 2100 g/10 min;

Polypropylene Homopolymer (PPH-4)

The at least one polypropylene homopolymer (PPH-4) has a melt flow rate MFR$_2$ (230° C., 2.16 kg, measured according to ISO 1133) in the range of 400 to 500 g/10 min, preferably of 420 to 480 g/10 min, such as 450 g/10 min.

The polypropylene homopolymer (PPH-4) has a melting temperature of at least 145° C.; preferably of at least 155° C., preferably in the range of 150 to 170° C., like 161° C.

In the following more specific embodiments of the present composition are described.

In a first embodiment a polyolefin composition is provided that comprises a) 20-40 wt %, preferably 25-35 wt %, more preferably 28-32 wt % of at least one heterophasic polypropylene copolymer (PPHeco-1) having a melt flow rate MFR$_2$ (230° C., 2.16 kg, measured according to ISO 1133) in the range of 80 to 120 g/10 min, preferably of 90 to 110 g/10 min, more preferably of 100 to 105 g/10 min;

b) 10-30 wt %, preferably 12-27 wt %, more preferably 15-25 wt % of the at least one polypropylene homopolymer (PPH-1) having a melt flow rate MFR$_2$ (230° C., 2.16 kg, measured according to ISO 1133) in the range of 600 to 1000 g/10 min, preferably of 700 to 900 g/10 min, more preferably of 800 to 850 g/10 min;

c) 40-60 wt %, preferably 50-55 wt % of the blend (A) of recycled plastic material comprising polypropylene and polyethylene, and optionally further additives, wherein the sum of all ingredients always adds up to 100 wt %.

Such a first polyolefin composition may have a melt flow rate MFR$_2$ (230° C., 2.16 kg, measured according to ISO 1133) in the range between 50 and 80 g/10 min, preferably between 55 and 75 g/10 min, more preferably between 60 and 72 g/10 min a tensile modulus (ISO 527-2) in a range between 1200 and 1500 MPa, more in particular between 1300 and 1400 MPa;

an impact strength (Charpy 1 eA+23° C.) in a range between 4 and 8 kJ/m$^2$, more in particular between 4.2 and 7.7 kJ/m$^2$, even more in particular between 4.8 and 7 kJ/m$^2$, and most in particular between 5.4 and 6.6 kJ/m$^2$, and a puncture energy (ISO 6603-2, 4.4 m/s, 2 mm, 23° C.) in a range between 1.5 and 15 J, more particular between 2 and 12 J, even more in particular between 5 and 10 J.

In a second embodiment a polyolefin composition is provided that comprises a) 20-40 wt %, preferably 25-35 wt %, more preferably 28-32 wt % of at least one heterophasic polypropylene copolymer (PPHeco-2) having a melt flow rate MFR$_2$ (230° C., 2.16 kg, measured according to ISO 1133) in the range of 60 to 90 g/10 min, more preferably of 70 to 80 g/10 min;

b) 10-30 wt %, preferably 12-27 wt %, more preferably 15-25 wt % of the at least one polypropylene homopolymer (PPH-1) having a melt flow rate $MFR_2$ (230° C., 2.16 kg, measured according to ISO 1133) in the range of 600 to 1000 g/10 min, preferably of 700 to 900 g/10 min, more preferably of 800 to 850 g/10 min;

c) 40-60 wt %, preferably 50-55 wt % of the blend (A) of recycled plastic material comprising polypropylene and polyethylene, and optionally further additives, wherein the sum of all ingredients always adds up to 100 wt %.

Such a second polyolefin composition may have a melt flow rate $MFR_2$ (230° C., 2.16 kg, measured according to ISO 1133) in the range between 50 and 80 g/10 min, preferably between 55 and 75 g/10 min, more preferably between 60 and 72 g/10 min a tensile modulus (ISO 527-2) in a range between 1200 and 1500 MPa, more in particular between 1300 and 1400 MPa;

an impact strength (Charpy 1 eA+23° C.) in a range between 4 and 8 $kJ/m^2$, more in particular between 4.2 and 7.7 $kJ/m^2$, even more in particular between 4.8 and 7 $kJ/m^2$, and most in particular between 5.4 and 6.6 $kJ/m^2$, and a puncture energy (ISO 6603-2, 4.4 m/s, 2 mm, 23° C.) in a range between 1.5 and 15 J, more particular between 2 and 12 J, even more in particular between 5 and 10 J.

In a third embodiment a polyolefin composition is provided that comprises a) 35-48 wt %, preferably 40-48 wt %, more preferably 45-48 wt % of the at least one heterophasic polypropylene copolymer (PPHeco-1) having a melt flow rate $MFR_2$ (230° C., 2.16 kg, measured according to ISO 1133) in the range of 80 to 120 g/10 min, preferably of 90 to 110 g/10 min, more preferably of 100 n to 105 g/10 min b) 2-10 wt %, preferably 2-5 wt %, more preferably 2-3 wt % of the at least one polypropylene homopolymer (PPH-1) having a melt flow rate $MFR_2$ (230° C., 2.16 kg, measured according to ISO 1133) in the range of 600 to 1000 g/10 min, preferably of 700 to 900 g/10 min, more preferably of 800 to 850 g/10 min; and c) 40-60 wt %, preferably 50-55 wt % of the blend (A) of recycled plastic material comprising polypropylene and polyethylene.

Such a third polyolefin composition may have a melt flow rate $MFR_2$ (230° C., 2.16 kg, measured according to ISO 1133) in a range between 25 and 50 g/10 min, preferably between 27 and 45 g/10 min, more preferably between 30 and 42 g/10 min;

a tensile modulus (ISO 527-2) in a range between 1200 and 1500 MPa, more in particular between 1300 and 1400 MPa;

an impact strength (Charpy 1 eA+23° C.) in a range between 4 and 8 $kJ/m^2$, more in particular between 4.2 and 7.7 $kJ/m^2$, even more in particular between 4.8 and 7 $kJ/m^2$, and most in particular between 5.4 and 6.6 $kJ/m^2$, and a puncture energy (ISO 6603-2, 4.4 m/s, 2 mm, 23° C.) in a range between 1.5 and 15 J, more particular between 2 and 12 J, even more in particular between 5 and 10 J.

In a fourth embodiment a polyolefin composition is provided that comprises a) 35-48 wt %, preferably 40-48 wt %, more preferably 45-48 wt % of the at least one heterophasic polypropylene copolymer (PPHeco-2) having a melt flow rate $MFR_2$ (230° C., 2.16 kg, measured according to ISO 1133) in the range of 60 to 90 g/10 min, more preferably of 70 to 80 g/10 min.

b) 2-10 wt %, preferably 2-5 wt %, more preferably 2-3 wt % of the at least one polypropylene homopolymer (PPH-1) having a melt flow rate $MFR_2$ (230° C., 2.16 kg, measured according to ISO 1133) in the range of 600 to 1000 g/10 min, preferably of 700 to 900 g/10 min, more preferably of 800 to 850 g/10 min; and c) 40-60 wt %, preferably 50-55 wt % of the blend (A) of recycled plastic material comprising polypropylene and polyethylene.

Such a fourth polyolefin composition may have a melt flow rate $MFR_2$ (230° C., 2.16 kg, measured according to ISO 1133) in a range between 25 and 50 g/10 min, preferably between 27 and 45 g/10 min, more preferably between 30 and 42 g/10 min;

a tensile modulus (ISO 527-2) in a range between 1200 and 1500 MPa, more in particular between 1300 and 1400 MPa;

an impact strength (Charpy 1 eA+23° C.) in a range between 4 and 8 $kJ/m^2$, more in particular between 4.2 and 7.7 $kJ/m^2$, even more in particular between 4.8 and 7 $kJ/m^2$, and most in particular between 5.4 and 6.6 $kJ/m^2$, and a puncture energy (ISO 6603-2, 4.4 m/s, 2 mm, 23° C.) in a range between 1.5 and 15 J, more particular between 2 and 12 J, even more in particular between 5 and 10 J.

Blend A) of Recycled Material

Blend (A) is obtained from a recycled waste stream. Blend (A) can be either recycled post-consumer waste or post-industrial waste, such as for example from the automobile industry, or alternatively, a combination of both. It is particularly preferred that blend (A) consists of recycled post-consumer waste and/or post-industrial waste.

In one aspect blend (A) may be a polypropylene (PP) rich material of recycled plastic material that comprises significantly more polypropylene than polyethylene. Recycled waste streams, which are high in polypropylene can be obtained for example from the automobile industry, particularly as some automobile parts such as bumpers are sources of fairly pure polypropylene material in a recycling stream or by enhanced sorting. The PP rich material may be obtainable by selective processing, degassing and filtration and/or by separation according to type and colors such as NIR or Raman sorting and VIS sorting. It may be obtained from domestic waste streams (i.e. it is a product of domestic recycling) for example the "yellow bag" recycling system organized under the "Green dot" organization, which operates in some parts of Germany.

Preferably, the polypropylene rich recycled material is obtained from recycled waste by means of plastic recycling processes known in the art. Such PP rich recyclates are commercially available, e.g. from Corepla (Italian Consortium for the collection, recovery, recycling of packaging plastic wastes), Resource Plastics Corp. (Brampton, ON), Kruschitz GmbH, Plastics and Recycling (AT), Vogt Plastik GmbH (DE), Mtm Plastics GmbH (DE) etc. None exhaustive examples of polypropylene rich recycled materials include: Dipolen®PP, Purpolen®PP (Mtm Plastics GmbH), Axpoly® recycled polypropylene pellets (Axion Ltd) and PolyPropylene Copolymer (BSP Compounds). It is considered that the solution could be applicable to a broad range of recycled polypropylene materials or materials or compositions having a high content of recycled polypropylene. The polypropylene-rich recycled material may be in the form of granules.

As mentioned previously, the polyolefin composition in accordance with the solution comprises as component A) a polymer blend, comprising a1) polypropylene and a2) polyethylene; wherein the weight ratio of a1) to a2) is from 3:7 to 12:1; and wherein the polymer blend A) is a recycled material.

Still a further preferred embodiment of the solution stipulates that the ratio of polypropylene a1) to polyethylene a2) is from 7:1 to 10:1 and preferably from 8:1 to 9.5:1.

Another preferred embodiment of the solution stipulates that the melt enthalpy of component a2)/melt enthalpy of component a1) in the polymer composition is in the range of 0.2 to 2.0 and preferably in the range of 0.25 to 1.75.

According to one embodiment, blend (A) of recycled plastic material comprises a relative amount of units derived from propylene of greater than 50 wt %, preferably greater than 53 wt %, more preferably greater than 60 wt %, more preferably greater than 70 wt %, more preferably greater than 75 wt %, more preferably greater than 80 wt %, still more preferably greater than 90 wt % and even more preferably greater than 95 wt % with respect to the total weight of the composition of blend A.

Still a further preferred embodiment of the solution stipulates that the content of polypropylene a1) in component A) is in the range from 75 to 99 wt.-% and preferably in the range from 83 to 95 wt.-% based on the overall weight of component A). The content of polypropylene a1) in component A) may be determined by FTIR spectroscopy as described in the experimental section. More preferably component a1) comprises more than 95 wt.-%, preferably from 96 to 99.9 wt.-% isotactic polypropylene and most preferably consists of isotactic polypropylene.

Furthermore, blend (A) may have a relative amount of units derived from ethylene of less than 47 wt %, more preferably less than 40 wt %, more preferably less than 30 wt %, more preferably less than 20 wt %, most preferably less than 10 wt %. Usually, the relative amount of units derived from ethylene is more than 5 wt % with respect to the total weight blend (A) It is to be understood that the ethylene present is preferably ethylene derived from polyethylene and ethylene containing copolymers.

In another preferred embodiment of the solution the content of polyethylene a2) in component A) is in the range from 1 to 25 wt.-%, preferably in the range from 5 to 20 wt % and more preferably in the range from 7 to 17 wt.-% based on the overall weight of component A). The content of polyethylene a2) in component A) may be determined by FTIR spectroscopy as described in the experimental section. More, preferably component a2) consists of polyethylene and ethylene containing copolymers.

The polyethylene fraction of the recycled material can comprise recycled high-density polyethylene (rHDPE), recycled medium-density polyethylene (rMDPE), recycled low-density polyethylene (rLDPE), linear low density polyethylene (LLDPE) and the mixtures thereof. In a certain embodiment, the recycled material is high density PE with an average density of greater than 0.8 $g/cm^3$, preferably greater than 0.9 $g/cm^3$, most preferably greater than 0.91 $g/cm^3$.

The polyethylene fraction of the recycled material may also comprise a plastomer. A plastomer is a polymer material that combines rubber-like properties with the processing ability of plastic. Important plastomers are ethylene-alpha olefin copolymers.

The ethylene based plastomer is preferably a copolymer of ethylene and a $C_4$-$C_8$ alpha-olefin. Suitable $C_4$-$C_8$ alpha-olefins include 1-butene, 1-hexene and 1-octene, preferably 1-butene or 1-octene and more preferably 1-octene. Preferably, copolymers of ethylene and 1-octene are used. Such ethylene based plastomers are commercially available, i.a. from Borealis AG (AT) under the tradename Queo, from DOW Chemical Corp (USA) under the tradename Engage or Affinity, or from Mitsui under the tradename Tafmer. Alternatively, the ethylene based plastomer can be prepared by known processes, in a one stage or two stage polymerization process, comprising solution polymerization, slurry polymerization, gas phase polymerization or combinations therefrom, in the presence of suitable catalysts, like vanadium oxide catalysts or single-site catalysts, e.g. metallocene or constrained geometry catalysts, known to the art skilled persons. It is possible that the ethylene based plastomer is already contained in the post-consumer and/or post-industrial waste being used for the production of blend (A). Alternatively it is possible that the ethylene based plastomer is added to the post-consumer and/or post-industrial waste during the waste plastic recycling process where blend (A) is produced.

Another preferred embodiment of the solution stipulates that component A) comprises less than 5 wt.-%, preferably less than 3 wt.-% and more preferably from 0.01 to 2 wt.-% based on the overall weight of component A) of thermoplastic polymers different from a1) and a2), more preferably less than 4.0 wt.-% PA 6 and less than 5 wt.-% polystyrene, still more preferably component A) comprises 0.5 to 3 wt.-% polystyrene.

According to still another preferred embodiment of the solution component A) comprises less than 5 wt.-%, preferably less than 4 wt.-% and more preferably from 0.01 to 4 wt.-% based on the overall weight of component A) of talc.

In another preferred embodiment of the solution component A) comprises less than 4 wt.-%, preferably less than 3 wt.-% and more preferably from 0.01 to 2 wt.-% based on the overall weight of component A) of chalk.

According to another preferred embodiment of the solution component A) comprises less than 1 wt.-%, preferably less than 0.5 wt.-% and more preferably from 0.01 to 1 wt.-% based on the overall weight of component A) of paper.

Still another preferred embodiment of the solution stipulates that component A) comprises less than 1 wt.-%, preferably less than 0.5 wt.-% and more preferably from 0.01 to 1 wt.-% based on the overall weight of component A) of wood.

In another preferred embodiment of the solution component A) comprises less than 1 wt.-%, preferably less than 0.5 wt.-% and more preferably from 0.01 to 1 wt.-% based on the overall weight of component A) of metal.

According to the solution, blend (A) has a content of limonene as determined using solid phase microextraction (HS-SPME-GC-MS) of 0.1 ppm to 100 ppm, more preferably from 1 ppm to 50 ppm, most preferably from 2 ppm to 35 ppm. Limonene is conventionally found in recycled polyolefin materials and originates from packaging applications in the field of cosmetics, detergents, shampoos and similar products. Therefore, blend (A) contains limonene, when blend (A) contains material that originates from such types of domestic waste streams.

The fatty acid content is yet another indication of the recycling origin of blend (A). However, in some cases, the fatty acid content may be below the detection limit due to specific treatments in the recycling process. According to the solution, blend (A) preferably has a content of fatty acids as determined using solid phase microextraction (HS-SPME-GC-MS) of from 1 ppm to 200 ppm, preferably from 1 ppm to 150 ppm, more preferably from 2 ppm to 100 ppm, most preferably from 3 ppm to 80 ppm.

In a preferred aspect, blend (A) (i) contains less than 5 wt %, preferably less than 1.5 wt % polystyrene; and/or (ii) contains less than 3.5 wt %, preferably less than 1 wt % talc; and/or (iii) contains less than 1.0 wt %, preferably less than 0.5 wt % polyamide.

Due to the recycling origin blend (A) may also contain: organic fillers, and/or inorganic fillers, and/or additives in amounts of up to 10 wt %, preferably 3 wt % with respect to the weight of blend (A).

Thus, in an embodiment of the present polyolefin composition blend (A) of recycled plastic material comprises A-1) a content of polypropylene of 50-99 wt %, A-2) a content of polyethylene of 1-40 wt %, A-3) 0 to 5.0 wt % of polystyrene and/or copolymers such as ABS, A-4) 0 to 3.0 wt % stabilizers, A-5) 0 to 4.0 wt % polyamide-6, A-6) 0 to 3.0 wt % talc, A-7) 0 to 3.0 wt % chalk, A-8) 0 to 1.0 wt % paper, A-9) 0 to 1.0 wt % wood, A-10) 0 to 0.5 wt % metal, A-11) 0.1 ppm to 100 ppm of limonene as determined by using solid phase microextraction (HS-SPME-GC-MS), and A-12) 0 to 200 ppm total fatty acid content as determined by using solid phase microextraction (HS-SPME-GC-MS)

wherein all amounts are given with respect to the total weight of blend (A).

As stated above blend (A) may include one or more further components, selected from:

A-4) up to 3.0 wt % stabilizers, preferably up to 2.0 wt % stabilizers,

A-5) up to 4.0 wt % polyamide-6, preferably up to 2.0 wt % polyamide-6,

A-6) up to 3.0 wt % talc, preferably up to 1.0 wt % talc,

A-7) up to 3.0 wt % chalk, preferably up to 1.0 wt % chalk,

A-8) up to 1.0 wt % paper, preferably up to 0.5 wt % paper,

A-9) up to 1.0 wt % wood, preferably up to 0.5 wt % wood, and

A-10) up to 0.5 wt % metal, preferably up to 0.1 wt % metal, based on the overall weight of blend (A).

In one embodiment blend (A) of recycled plastic material may have a melt flow rate (ISO 1133, 2.16 kg, 230° C.) of 4 to 20 g/10 min, preferably of 5 to 15 g/10 min, more preferably of 6 to 12 g/10 min.

According to another embodiment blend (A) of recycled plastic material may have a melt flow rate $MFR_2$ (ISO 1133, 230° C., 2.16 kg) in the range of 16 to 50 g/10 min and preferably in the range of 18 to 22 g/10 min.

In a further preferred embodiment of the solution the Charpy Notched Impact Strength measured according to ISO 179-1 eA at 23° C. of blend A) is more than 3.0 kJ/m², preferably in the range from 4.0 to 7.0 kJ/m² and more preferably in the range from 5.0 to 6.0 kJ/m².

A further preferred embodiment of the solution stipulates that the Tensile Modulus measured according to ISO527-2 of blend A) is in the range of 800 to 1500 MPa and preferably in the range of 1100 to 1400 MPa.

The present polyolefin composition is preferably free of glass fibers, and/or chalk (except for the small amounts that may be present in the recycled material of blend A).

However, further additives may be added.

Additives

In one embodiment the polyolefin composition may comprise at least one dosing agent for accepting fillers/pigments during extrusion. The at least one coupling agent may be a polypropylene homopolymer with melt flow rates MFR2 between 1 and 5 g/10 min, preferably between 2 and 3 g/10 min and a density between 800 and 100 kg/m3, preferably between 900 and 950 kg/m3. Such a polymer is commercially available, for example under the trade name HC001A-B1 of Borealis AG. The amount of dosing agent in the polyolefin composition may be 1-2 wt %, such as 1.2-1.4 wt %.

In another embodiment the polyolefin composition may comprise at least one impact modifier. The impact modifier may be a plastomer and/or an elastomer. Suitable elastomers may be ethylene/propylene copolymers with different C2/C3 ratio (C2/C3 or C3/C2 elastomers), ethylene/butene copolymers (C2/C4 elastomers), ethylene/octene copolymers (C2/C8 elastomers), grafted ethylene elastomers (such as MAH grafted ethylene elastomers) or C2/C3 and C2/C4 block copolymers, in particular an ethylene based 1-octene elastomer. The ethylene based 1-octene elastomer may have an MFR (190° C., 2.16 kg) between 0.5 and 8 g/10 min, a density between 866-904 kg/m³. Such a compound is commercially available, for example under the trade name Queo 6800.

Examples of other additives for use in the composition are pigments or dyes (for example carbon black), stabilizers (anti-oxidant agents), anti-acids and/or anti-UVs, antistatic agents, nucleating agents and utilization agents (such as processing aid agents). Preferred additives are carbon black, at least one antioxidant and/or at least one UV stabilizer.

Generally, the amount of these additives is in the range of 0 to 5.0 wt %, preferably in the range of 0.01 to 3.0 wt %, more preferably from 0.01 to 2.0 wt % based on the weight of the total composition.

Examples of antioxidants which are commonly used in the art, are sterically hindered phenols (such as CAS No. 6683-19-8, also sold as Irganox 1010 FF™ by BASF), phosphorous based antioxidants (such as CAS No. 31570-04-4, also sold as Hostanox PAR 24 (FF)™ by Clariant, or Irgafos 168 (FF)™ by BASF), sulphur based antioxidants (such as CAS No. 693-36-7, sold as Irganox PS-802 FL™ by BASF), nitrogen-based antioxidants (such as 4,4'-bis(1, 1'-dimethylbenzyl)diphenylamine), or antioxidant blends. Preferred antioxidants may be Tris (2,4-di-t-butylphenyl) phosphite and/or Octadecyl 3-(3',5'-di-tert. butyl-4-hydroxy-phenyl)propionate.

Anti-acids are also commonly known in the art. Examples are calcium stearates, sodium stearates, zinc stearates, magnesium and zinc oxides, synthetic hydrotalcite (e.g. SHT, CAS-No. 11097-59-9), lactates and lactylates, as well as calcium stearate (CAS No. 1592-23-0) and zinc stearate (CAS No. 557-05-1).

Common antiblocking agents are natural silica such as diatomaceous earth (such as CAS No. 60676-86-0 (SuperfFloss™), CAS-No. 60676-86-0 (SuperFloss E™), or CAS-No. 60676-86-0 (Celite 499™)), synthetic silica (such as CAS-No. 7631-86-9, CAS-No. 7631-86-9, CAS-No. 7631-86-9, CAS-No. 7631-86-9, CAS-No. 7631-86-9, CAS-No. 7631-86-9, CAS-No. 112926-00-8, CAS-No. 7631-86-9, or CAS-No. 7631-86-9), silicates (such as aluminium silicate (Kaolin) CAS-no. 1318-74-7, sodium aluminium silicate

15

16

CAS-No. 1344-00-9, calcined kaolin CAS-No. 92704-41-1, aluminum silicate CAS-No. 1327-36-2, or calcium silicate CAS-No. 1344-95-2), synthetic zeolites (such as sodium calcium aluminosilicate hydrate CAS-No. 1344-01-0, CAS-No. 1344-01-0, or sodium calcium aluminosilicate, hydrate CAS-No. 1344-01-0).

Anti-UVs are, for example, Bis-(2,2,6,6-tetramethyl-4-piperidyl)-sebacate (CAS-No. 52829-07-9, Tinuvin 770); 2-hydroxy-4-n-octoxy-benzophenone (CAS-No. 1843-05-6, Chimassorb 81). Preferred UV stabilizers may be low and/or high molecular weight UV stabilizers such as n-Hexadecyl-3,5-di-t-butyl-4-hydroxybenzoate, A mixture of esters of 2,2,6,6-tetramethyl-4-piperidinol and higher fatty acids (mainly stearic acid) and/or Poly((6-morpholino-s-triazine-2,4-diyl)(1,2,2,6,6-pentamethyl-4-piperidyl)imino)hexam-eth-ylene (1,2,2,6,6-pentamethyl-4-piperidyl)imino)).

Alpha nucleating agents like sodium benzoate (CAS No. 532-32-1); 1,3:2,4-bis(3,4-dimethylbenzylidene)sorbitol (CAS 135861-56-2, Millad 3988). Suitable antistatic agents are, for example, glycerol esters (CAS No. 97593-29-8) or ethoxylated amines (CAS No. 71786-60-2 or 61791-31-9) or ethoxylated amides (CAS No. 204-393-1). Usually these additives are added in quantities of 100-2.000 ppm for each individual component of the polymer.

It is appreciated that the solution also refers to a process for producing the polyolefin compositions as defined herein. The process comprises the steps of > providing a mixture of the at least one polypropylene homopolymer b); the at least one heterophasic polypropylene copolymer a); and the blend (A) of recycled plastic material, in the required amounts;
>
> melting the mixture in an extruder, and
>
> optionally pelletizing the obtained polyolefin composition.

For the purposes of the solution, any suitable melting and mixing means known in the art may be used for carrying out the mixing and melting.

However, the melting and mixing step preferably takes place in a mixer and/or blender, high or low shear mixer, high-speed blender, or a twin-screw extruder. Most preferably, the melting and mixing step takes place in a twin-screw extruder such as a co-rotating twin-screw extruder. Such twin-screw extruders are well known in the art and the skilled person will adapt the melting and mixing conditions (such as melting temperature, screw speed and the like) according to the process equipment.

The polyolefin composition according to the invention can The polyolefin composition according to the solution can be used for a wide range of applications, for example in the manufacture of caps, closures, lids, thin wall packaging.

EXPERIMENTAL SECTION

The following Examples are included to demonstrate certain aspects and embodiments of the solution as described in the claims. It should be appreciated by those of skill in the art, however, that the following description is illustrative only and should not be taken in any way as a restriction of the solution.

Test Methods

The following definitions of terms and determination methods apply for the above general description of the solution as well as to the below examples unless otherwise defined.

a) Amount of iPP, Polystyrene, Content of ethylene (and ethylene containing copolymers) and Amount of Poly-amide-6 and polystyrene (and containing copolymers)

To establish different calibration curves different standards, iPP and HDPE and iPP, PS and PA6 were blended. For the quantification of the content of the foreign polymers, IR spectra were recorded in the solid-state using a Bruker Vertex 70 FTIR spectrometer. Films were prepared with a compression-moulding device at 190° C. with 4-6 MPa clamping force. The thickness of the films for the calibration standards for iPP and HDPE was 300 μm and for the quantification of the iPP, PS and PA 6 50-100 μm film thickness was used. Standard transmission FTIR spectroscopy is employed using a spectral range of 4000-400 cm$^{-1}$, an aperture of 6 mm, a spectral resolution of 2 cm$^{-1}$, 16 background scans, 16 spectrum scans, an interferogram zero filling factor of 32 and Norton Beer strong apodisation.

The absorption of the band at 1167 cm$^{-1}$ in iPP is measured and the iPP content is quantified according to a calibration curve (absorption/thickness in cm versus iPP content in weight %). The absorption of the band at 1601 cm$^{-1}$ (PS) and 3300 cm$^{-1}$ (PA6) are measured and the PS and PA6 content quantified according to the calibration curve (absorption/thickness in cm versus PS and PA content in wt %). The content of polyethylene and ethylene containing copolymers is obtained by subtracting (iPP+PS+PA6) from 100, taking into account the content of non-polymeric impurities as determined in the methods below. The analysis is performed as a double determination.

b) Amount of Talc and Chalk were measured by Thermogravimetric Analysis (TGA);

> experiments were performed with a Perkin Elmer TGA 8000. Approximately 10-20 mg of material was placed in a platinum pan. The temperature was equilibrated at 50° C. for 10 minutes, and afterwards raised to 950° C. under nitrogen at a heating rate of 20° C./min. The weight loss between ca. 550° C. and 700° C. (WCO2) was assigned to CO$_2$ evolving from CaCO$_3$, and therefore the chalk content was evaluated as:

Chalk content=100/44×WCO2

Afterwards the temperature was lowered to 300° C. at a cooling rate of 20° C./min. Then the gas was switched to oxygen, and the temperature was raised again to 900° C. The weight loss in this step was assigned to carbon black (Wcb). Knowing the content of carbon black and chalk, the ash content excluding chalk and carbon black was calculated as:

Ash content=(Ash residue)−56/44×WCO2−Wcb

Where Ash residue is the weight % measured at 900° C. in the first step conducted under nitrogen. The ash content is estimated to be the same as the talc content for the investigated recyclates.

c) Amount of Paper, Wood

Paper and wood were determined by conventional laboratory methods including milling, floatation, microscopy and Thermogravimetric Analysis (TGA) or floating techniques.

d) Amount of Metals was determined by x ray fluorescence (XRF).

e) Amount of Limonene was determined by solid phase microextraction (HS-SPME-GC-MS). Additional details are given below with respect to the specific sample.

f) Amount of total fatty acids was determined by solid phase microextraction (HS-SPME-GC-MS).

Additional details are given below with respect to the specific sample.

g) Melt flow rates were measured with a load of 2.16 kg (MFR$_2$) at 230° C. or 190° C. as indicated. The melt flow rate is that quantity of polymer in grams which the test apparatus standardized to ISO 1133 extrudes within 10 minutes at a temperature of 230° C. (or 190° C.) under a load of 2.16 kg.

h) Tensile Modulus, Tensile Strength, Tensile Strain at Break, Tensile Strain at Tensile Strength, Tensile Stress at Break The measurements were conducted after 96 h conditioning time (at 23° C. at 50% relative humidity) of the test specimen.

Tensile Modulus was measured according to ISO 527-2 (cross head speed=1 mm/min; 23° C.) using injection moulded specimens as described in EN ISO 1873-2 (dog bone shape, 4 mm thickness).

Tensile strength and tensile Strain at Break was measured according to ISO 527-2 (cross head speed=50 mm/min; 23° C.) using injection moulded specimens as described in EN ISO 1873-2 (dog bone shape, 4 mm thickness).

Tensile Strain at Tensile Strength was determined according to ISO 527-2 with an elongation rate of 50 mm/min until the specimen broke using injection moulded specimens as described in EN ISO 1873-2 (dog bone shape, 4 mm thickness).

Tensile Stress at Break was determined according to ISO 527-2 (cross head speed=50 mm/min) on samples prepared from compression-moulded plaques having a sample thickness of 4 mm.

i) Impact strength was determined as Charpy Impact Strength according to ISO 179-1/1 eA at +23° C. (Notched) or according to ISO 179-1/1 eU+23° C. (Unnotched) on injection moulded specimens of 80'10×4 mm prepared according to EN ISO 1873-2. According to this standard samples are tested after 96 hours.

j) Puncture energy was determined according to ISO 6603-2, 4.4 m/s, 2 mm, 23° C.

k) Xylene Cold Solubles (XCS) are measured at 25° C. according ISO 16152; first edition; 2005-07-01.

l) Crystex Analysis

Crystalline and Soluble Fractions Method

The crystalline (CF) and soluble fractions (SF) of the polypropylene (PP) compositions as well as the comonomer content and intrinsic viscosities of the respective fractions were analyzed by the CRYSTEX QC, Polymer Char (Valencia, Spain). The crystalline and amorphous fractions are separated through temperature cycles of dissolution at 160° C., crystallization at 40° C. and re-dissolution in a 1,2,4-trichlorobenzene (1,2,4-TCB) at 160° C. Quantification of SF and CF and determination of ethylene content (C2) of the parent EP copolymer and its soluble and crystalline fractions are achieved by means of an infrared detector (IR4) and an online 2-capillary viscometer which is used for the determination of the intrinsic viscosity (iV).

The IR4 detector is a multiple wavelength detector detecting IR absorbance at two different bands (CH3 and CH2) for the determination of the concentration and the Ethylene content in Ethylene-Propylene copolymers. IR4 detector is calibrated with series of 8 EP copolymers with known Ethylene content in the range of 2 wt.-% to 69 wt.-% (determined by $^{13}$C-NMR spectroscopy) and various concentration between 2 and 13 mg/ml for each used EP copolymer used for calibration. The amount of Soluble fraction (SF) and Crystalline Fraction (CF) are correlated through the XS calibration to the "Xylene Cold Soluble" (XCS) quantity and respectively Xylene Cold Insoluble (XCI) fractions, determined according to standard gravimetric method as per ISO16152. XS calibration is achieved by testing various EP copolymers with XS content in the range 2-31 wt.-%.

The intrinsic viscosity (iV) of the parent EP copolymer and its soluble and crystalline fractions are determined with a use of an online 2-capillary viscometer and are correlated to corresponding iV's determined by standard method in decalin according to ISO 1628. Calibration is achieved with various EP PP copolymers with iV=2-4 dL/g.

A sample of the PP composition to be analyzed is weighed out in concentrations of 10 mg/ml to 20 mg/ml. After automated filling of the vial with 1,2,4-TCB containing 250 mg/l 2,6-tert-butyl-4-methylphenol (BHT) as antioxidant, the sample is dissolved at 160° C. until complete dissolution is achieved, usually for 60 min, with constant stirring of 800 rpm.

A defined volume of the sample solution is injected into the column filled with inert support where the crystallization of the sample and separation of the soluble fraction from the crystalline part is taking place. This process is repeated two times. During the first injection the whole sample is measured at high temperature, determining the iV[dl/g] and the C2[wt.-%] of the PP composition. During the second injection the soluble fraction (at low temperature) and the crystalline fraction (at high temperature) with the crystallization cycle are measured (wt.-% SF, wt.-% C2, iV).

EP means ethylene propylene copolymer.

PP means polypropylene.

m) Intrinsic Viscosity is measured according to DIN ISO 162811, October 1999 (in Decalin at 135° C.).

n) Heat ageing experiment storage at 120° C. for 300 h:

6 tensile bars were put in a circulating air oven. The shape of each tensile bar was 1A specimen from the ISO 527-2. The tensile bars were stored on a metal grid in an Heraeus NTU 75/125 circulating air oven and were conditioned at 120° C. for 300 hours. After the conditioning time the specimen were retrieved and conditioned in a controlled climate at 23° C./50% r.H.

storage at 150° C. for 75 h:

6 tensile bars were put in a circulating air oven. The shape of each tensile bar was 1A specimen from the ISO 527-2. The tensile bars were stored on a metal grid in an Vötsch HeatEvent 60/60 circulating air oven and were conditioned at 150° C. for 75 hours. After the conditioning time the specimen were retrieved and conditioned in a controlled climate at 23° C./50% r.H.

In the following Tables 1-2 several examples (comparative-CE; inventive-IE) are summarized.

Different blends A1-A4 of recycled material were used. The blends are characterized by the following properties:

Blend A-1:

total C2 content 8-10 wt %, C2 (CF) content 7-8 wt %, C2 (SF) content 28-30 wt %, MFR$_2$ 10-16 g/10 min, tensile modulus 1100-1350 MPa, Impact strength (charpy test 23° C.) 4-7 KJ/m$^2$ Blend A-2:

total C2 content 9-21 wt %, C2 (CF) content 16-19 wt %, C2 (SF) content 32-35 wt %, MFR$_2$ 15-25 g/10 min, tensile modulus 1150-1350 MPa, Impact strength (charpy test 23° C.) 4-7 KJ/m$^2$ Blend A-3:

total C2 content 9-21 wt %, C2 (CF) content 7-20 wt %, C2 (SF) content 32-35 wt %, MFR$_2$ 10-40 g/10 min, tensile modulus 1100-1450 MPa, Impact strength (charpy test 23° C.) 5-7 KJ/m$^2$ Blend A-4:
  total C2 content 9-21 wt %, C2 (CF) content 7-20 wt %, C2 (SF) content 32-35 wt %, $MFR_2$ 10-40 g/10 min, tensile modulus 1100-1450 MPa, Impact strength (charpy test 23° C.) 5-7 KJ/m$^2$ Table 1 refers to a polyolefin composition comprising a) (IE2, IE5) one heterophasic polypropylene copolymer (PPHeco-1, $MFR_2$ of 100 g/10 min, $T_c$=112.3° C.), one polypropylene homopolymer (PPH-1, $MFR_2$ of 800 g/10 min, $T_c$=112.3° C.), and a blend A) of recycled material (Blend A-1, $MFR_2$ of 10-16 g/10 min, $T_c$=112.3° C.), b) (IE4) one heterophasic polypropylene copolymer (PPHeco-1, $MFR_2$ of 100 g/10 min, $T_c$=112.3° C.), one polypropylene homopolymer (PPH-1, $MFR_2$ of 800 g/10 min, $T_c$=112.3° C.), and a blend A) of recycled material (Blend A-2, $MFR_2$ of 15-25 g/10 min, $T_c$=112.3° C.), c) (IE1) one heterophasic polypropylene copolymer (PPHeco-2, $MFR_2$ of 70 g/10 min, $T_c$=112.3° C.),) one polypropylene homopolymer (PPH-1, $MFR_2$ of 800 g/10 min, $T_c$=112.3° C.), and a blend A) of recycled material (Blend A-1, $MFR_2$ of 10-16 g/10 min, $T_c$=112.3° C.), and d) (IE3) one heterophasic polypropylene copolymer (PPHeco-2, $MFR_2$ of 70 g/10 min, $T_c$=112.3° C.),) one polypropylene homopolymer (PPH-1, $MFR_2$ of 800 g/10 min, $T_c$=112.3° C.), and a blend A) of recycled material (Blend A-2, $MFR_2$ of 15-25 g/10 min, $T_c$=112.3° C.), and further additives, e) (IE6) one heterophasic polypropylene copolymer (PPHeco-1, $MFR_2$ of 100 g/10 min, $T_c$=112.3° C.), one polypropylene homopolymer (PPH-1, $MFR_2$ of 800 g/10 min, $T_c$=112.3° C.), and a blend A) of recycled material (Blend A-3, $MFR_2$ of 10-40 g/10 min), and f) (IE7) one heterophasic polypropylene copolymer (PPHeco-1, $MFR_2$ of 100 g/10 min, $T_c$=112.3° C.), one polypropylene homopolymer (PPH-1, $MFR_2$ of 800 g/10 min, $T_c$=112.3° C.), and a blend A) of recycled material (Blend A-4, $MFR_2$ of 10-40 g/10 min).

Table 2 refers to properties of a polyolefin composition comprising one heterophasic polypropylene copolymer (PPHeco-2, $MFR_2$ of 70 g/10 min, $T_c$=112.3° C.),) one polypropylene homopolymer (PPH-1, $MFR_2$ of 800 g/10 min, $T_c$=112.3° C.), and a blend A) of recycled material (A-1, $MFR_2$ of 6-12 g/10 min, $T_c$=112.3° C.) and further additives (IE8-IE10).

The following additives were used: Antioxidants: AO1 (Irganox1010FF), AO2, (ARENOX DS), AO3 (IRGAFOS 168FF), AO4; Pigment: CB (Plasblak PE6121, commercially available from Cabot); AO501GRA/SONGNOX 21B FFand dosing agent HC001A-B1, FK1820.

TABLE 1

Properties of a polyolefin composition comprising one heterophasic polypropylene copolymer PPHeco-1 with $MFR_2$ of 100 g/10 min or PPHeco-2 $MFR_2$ of 70 g/10 min mixed with a blend of recycled material Blend A-1($MFR_2$ of 10-16 g/10 min) or Blend A-2 ($MFR_2$ of 15-25 g/10 min) (Comparative Examples CE1-4) and polyolefin compositions comprising one heterophasic polypropylene copolymer PPHeco-1 with $MFR_2$ of 100 g/10 min or PPHeco-2 $MFR_2$ of 70 g/10 min, one polypropylene homopolymer (PPH-1 with $MFR_2$ of 800 g/10 min) mixed with a blend of recycled material Blend A-1 (MFR2 of 10-16 g/10 min) or Blend A-2 (MFR2 of 15-25 g/10 min) and further additives according to the solution (Inventive Examples IE1-5) and polyolefin compositions comprising one heterophasic polypropylene copolymer PPHeco-1 with $MFR_2$ of 100 g/10 min, one polypropylene homopolymer (PPH-1 with $MFR_2$ of 800 g/10 min) mixed with a blend of recycled material Blend A-3 (MFR2 of 10-40 g/10 min) or Blend A-4 (MFR2 of 10-40 g/10 min (Inventive Examples IE6-7)

| Material | unit | CE1 | CE2 | CE3 | CE4 | IE1 | IE2 | IE3 | IE4 | IE5 | IE6 | IE7 |
|---|---|---|---|---|---|---|---|---|---|---|---|---|
| Blend A-1 | wt % | 50 | 50 | | | 50 | 50 | | | 55 | | |
| Blend A-2 | wt % | | | 50 | 50 | | | 50 | 50 | | | |
| Blend A-3 | | | | | | | | | | | 55 | |
| Blend A-4 | | | | | | | | | | | | 55 |
| PPHeco-2 | wt % | 47.5 | | 47.5 | | 28.5 | | 28.5 | | | | |
| PPHeco-1 | wt % | | 47.5 | | 47.5 | | 28.5 | | 32.5 | 25.5 | 31.5 | 25.5 |
| PPH-1 | wt % | | | | | 20 | 20 | 20 | 16 | 18 | 12 | 18 |
| AO501GRA/ SONGNOX 21B FF | wt % | 0.3 | 0.3 | 0.3 | 0.3 | 0.3 | 0.3 | 0.3 | 0.3 | 0.3 | 0.3 | 0.3 |
| HC001A-B1 | wt % | 1.2 | 1.2 | 1.2 | 1.2 | 1.2 | 1.2 | 1.2 | 1.2 | 1.2 | 1.2 | 1.1 |
| MB 90-WHITE 6-PE-70 | Wt % | 1 | 1 | 1 | 1 | | | | | | | |
| MFR2 230° C./2.16 kg | g/10 min | 24.3 | 28.5 | 36.4 | 40.7 | 57.5 | 69.1 | 65.3 | 70.1 | 65.5 | 71.2 | 71.6 |
| Tensile modulus 23° C. | MPa | 1384 | 1326 | 1406 | 1343 | 1394 | 1361 | 1333 | 1287 | 1339 | 1403 | 1321 |
| Tensile strength 23° C. | MPa | 27.1 | 25.5 | 25.4 | 23.8 | 27.6 | 27.4 | 24.6 | 24.3 | 27.2 | 26.1 | 25.3 |
| Impact strength 1eA +23° C. | kJ/m2 | 5.3 | 5.5 | 5.3 | 7.3 | 4.2 | 4.6 | 4.9 | 6.2 | 4.34 | 5.04 | 5.91 |
| Puncture Energy (ISO 6603-2, 2 mm) | J | 3.0 | 8.0 | 2.2 | 2.5 | 4.6 | 1.6 | 5.4 | 2.4 | | | |
| Heat ageing exposure | ° C./hours | | 120/300 | | 120/300 | | 120/300 | 120/300 | | | | |
| Tensile modulus (after heat exposure) | MPa | | 1568 | | 1555 | | 1671 | 1661 | | | | |

As can be seen in Table 1 the melt flow rate of the heterophasic copolymer-homopolymer-recyclate composition according to the inventive examples IE 1-7 is higher than the one of the heterophasic copolymer-recyclate compositions CE1-4. At the same time tensile modulus, impact strength and puncture energy are comparable. For IE2 and IE3 the same heat ageing exposure is achieved as for CE2 and CE4.

Thus, the properties of the heterophasic copolymer-homopolymer-recyclate composition according to the solution are characterized by a melt flow rate allowing a good processing and by a tensile modulus indicating a stable material.

TABLE 2

Properties of a polyolefin composition comprising a blend of recycled material Dipolen PP (Blend A-1 with $MFR_2$ of 6-12 g/10 min) or one heterophasic polypropylene copolymer (PPHeco-2, $MFR_2$ of 70 g/10 min, $T_c = 112.3°$ C.), mixed with a blend of recycled material Dipolen PP (Blend A-1 with $MFR_2$ of 6-12 g/10 min) (Comparative Examples CE5-6) and polyolefin compositions comprising one heterophasic polypropylene copolymer PPHeco-2 with $MFR_2$ of 70 g/10 min, one polypropylene homopolymer (PPH-1 with $MFR_2$ of 800 g/10 min) mixed with a blend of recycled material Dipolen PP (Blend A-1 with $MFR_2$ of 6-12 g/10 min) according to the solution (Inventive Examples IE8-10).

| Material | unit | CE-5 | CE-6 | IE-8 | IE-9 | IE-10 |
|---|---|---|---|---|---|---|
| Blend A-1 | wt % | 100 | 50 | 50 | 50 | 50 |
| PPHeco-2 | wt % | | 47.5 | 38.5 | 44.5 | 45.5 |
| PPH-1 | wt % | | | 3 | 3 | 2 |
| HC001A-B1 | wt % | | 1.2 | 1.2 | 1.2 | 1.2 |
| AO501GRA | wt % | | 0.3 | 0.3 | 0.3 | 0.3 |
| MB 90-WHITE 6-PE-70 35% | | | 1 | 1 | 1 | 1 |
| QUEO 6800LA | wt % | | | 6 | | |
| MFR2 230° C./ 2.16 kg | g/10 min | 12.4 | 24.3 | 23.4 | 27.5 | 26.2 |
| Tensile modulus 23° C. | MPa | 1250 | 1384 | 1291 | 1382 | 1389 |
| Impact strength 1eA +23° C. | kJ/m2 | 5.1 | 5.3 | 5.8 | 6.6 | 5.4 |
| puncture energy (ISO 6603-2, 2 mm) | J | 1.9 | 3.0 | 5.7 | 3.42 | 2.45 |

Table 2 shows that the melt flow rate of the heterophasic copolymer-homopolymer-recyclate composition according to the inventive examples IE8-10 is higher than the one of the recyclate (CE-5). Furthermore, in the inventive examples IE8-10 with the homopolymer the impact is increased compared to CE6 without homopolymer; with at the same time comparable tensile values.

The invention claimed is:

1. A polyolefin composition comprising a) 20-48 wt % of at least one heterophasic polypropylene copolymer with a melt flow rate $MFR_2$ (230° C., 2.16 kg, measured according to ISO 1133) of at least 40 g/10 min;

b) 2-30 wt % of at least one polypropylene homopolymer with a melt flow rate $MFR_2$ (230° C., 2.16 kg, measured according to ISO 1133) of at least 400 g/10 min; and c) 40-60 wt %, of a blend (A) of recycled plastic material comprising polypropylene and polyethylene in a ratio between 3:7 and 12:1, which is recovered from a waste plastic material derived from post-consumer and/or post-industrial waste, with a melt flow rate $MFR_2$ (230° C., 2.16 kg, measured according to ISO 1133) of at least 5 g/10 min, wherein the polyolefin composition has a melt flow rate $MFR_2$ (230° C., 2.16 kg, measured according to ISO 1133) of at least 20 g/10 min.

2. The polyolefin composition according to claim 1, wherein it comprises a) 25-45 wt % of the at least one heterophasic polypropylene copolymer;

b) 5-27 wt % of the at least one polypropylene homopolymer; and c) 50-55 wt % of the blend (A) of recycled plastic material comprising polypropylene and polyethylene and optionally further additives, wherein the sum of all ingredients always adds up to 100 wt %.

3. The polyolefin composition according to claim 1, wherein it comprises a) 20-40 wt % of the at least one heterophasic polypropylene copolymer;

b) 10-30 wt % of the at least one polypropylene homopolymer; and c) 40-60 wt % of the blend (A) of recycled plastic material comprising polypropylene and polyethylene and optionally further additives, wherein the sum of all ingredients always adds up to 100 wt %.

4. The polyolefin composition according to claim 3, wherein it has a melt flow rate $MFR_2$ (230° C., 2.16 kg, measured according to ISO 1133) of at least 50 g/10 min.

5. The polyolefin composition according to claim 1, wherein it comprises a) 35-48 wt % of the at least one heterophasic polypropylene copolymer;

b) 2-10 wt % of the at least one polypropylene homopolymer; and c) 40-60 wt % of the blend (A) of recycled plastic material comprising polypropylene and polyethylene and optionally further additives, wherein the sum of all ingredients always adds up to 100 wt %.

6. The polyolefin composition according to claim 5, wherein it has a melt flow rate $MFR_2$ (230° C., 2.16 kg, measured according to ISO 1133) of at least 25 g/10 min.

7. The polyolefin composition according to claim 1, wherein it has a tensile modulus (ISO 527-2) of at least 1200 MPa.

8. The polyolefin composition according to claim 1, wherein it has an impact strength (ISO179, charpy 1 eA+23° C.) of at least 4 kJ/m².

9. The polyolefin composition according to claim 1, wherein it has a puncture energy (ISO 6603-2, 4.4 m/s, 2 mm, 23° C.) of at least 1.5 J.

10. The polyolefin composition according to claim 1, wherein the at least one heterophasic polypropylene copolymer a) is selected from a group consisting of:

at least one heterophasic polypropylene copolymer (PPHeco-1) having a melt flow rate $MFR_2$ (230° C., 2.16 kg, measured according to ISO 1133) in the range of 80 to 120 g/10 min; and at least one heterophasic polypropylene copolymer (PPHeco-2) having a melt flow rate $MFR_2$ (230° C., 2.16 kg, measured according to ISO 1133) in the range of 60 to 90 g/10 min, and mixtures thereof.

11. The polyolefin composition according to claim 1, wherein the at least one polypropylene homopolymer b) is selected from a group consisting of:

at least one polypropylene homopolymer (PPH-1) having a melt flow rate $MFR_2$ (230° C., 2.16 kg, measured according to ISO 1133) in the range of 600 to 1000 g/10 min;

at least one polypropylene homopolymer (PPH-2) having a melt flow rate $MFR_2$ (230° C., 2.16 kg, measured according to ISO 1133) in the range of 1000 to 1500 g/10 min;

at least one polypropylene homopolymer (PPH-3) having a melt flow rate $MFR_2$ (230° C., 2.16 kg, measured according to ISO 1133) in the range of 1700 to 2300 g/10 min;

at least one polypropylene homopolymer (PPH-4) having a melt flow rate $MFR_2$ (230° C., 2.16 kg, measured according to ISO 1133) in the range of 400 to 500 g/10 min and mixtures thereof.

12. The polyolefin composition according to claim 1, wherein blend (A) of recycled plastic material comprises a relative amount of units derived from propylene of greater than 50 wt % with respect to the total weight of blend (A).

13. The polyolefin composition according to claim 1, wherein blend (A) of recycled plastic material comprises a relative amount of units derived from ethylene of less than 47 wt % with respect to the total weight of blend (A).

14. A process for producing the polyolefin composition according to claim 1, wherein the process comprises the steps of providing a mixture of the at least one polypropylene homopolymer b), the at least one heterophasic polypropylene copolymer a); and the blend (A) of recycled plastic material, in the required amounts;

melting the mixture in an extruder, and optionally pelletizing the obtained polyolefin composition.

15. An article comprising the polyolefin composition according to claim 1.

* * * * *